United States Patent [19]
Corley

[11] Patent Number: 5,007,548
[45] Date of Patent: Apr. 16, 1991

[54] GAS CYLINDER SAFETY DEVICE

[75] Inventor: Larry S. Corley, Houston, Tex.

[73] Assignee: Shell Oil Company, Houston, Tex.

[21] Appl. No.: 557,819

[22] Filed: Jul. 26, 1990

[51] Int. Cl.⁵ ............................................. F16K 17/00
[52] U.S. Cl. ...................................... 220/581; 220/203
[58] Field of Search ............... 220/203, 3, 85 R, 85 P, 220/89.3

[56] References Cited
U.S. PATENT DOCUMENTS

| | | | |
|---|---|---|---|
| 3,800,979 | 4/1974 | Piffath d et al. | 220/203 |
| 4,033,169 | 7/1977 | Keller | 220/3 |
| 4,549,668 | 10/1985 | Krauss et al. | 220/203 |
| 4,595,118 | 6/1986 | Azuma et al. | 220/203 |

Primary Examiner—Joseph Man-Fu Moy

[57] ABSTRACT

A pressure containing vessel is provided which incorporates a means, of restricting flow from the vessel, the means being internal to the vessel. This means to restrict flow reduces the resultant hazards in the event that fittings external to the vessel are inadvertently severed from the vessel.

12 Claims, 2 Drawing Sheets

GAS CYLINDER SAFETY DEVICE

FIELD OF THE INVENTION

This invention relates to portable devices to store high pressure compressible or volatile materials.

BACKGROUND OF THE INVENTION

Current commercial cylinders of high-pressure gases and high pressure volatile liquids are topped with valves which can be sheared off if the cylinder is dropped onto a hard surface such as a concrete slab, or through any other collision of the cylinder valve with a hard object. If the valve is sheared off, then the interior of the cylinder (which may be at a pressure of 2000 psi or higher) is suddenly opened to the atmosphere through an opening which may be ¼" or more in diameter. The resultant burst of high-pressure gas produces a force which accelerates the cylinder and can turn it into a missile which can cause death or serious injury to persons in the vicinity, or major damage to buildings or equipment.

In order to lessen the likelihood that the valve will be sheared off, commercial cylinders are shipped with a metal cap covering the valve. The cap is supposed to be kept on whenever the cylinder is transported, or when it is stationary but not secured by chains or clamps. When the cylinder is in use, the cap must be removed in order to allow a regulator to be attached to the valve. It is also good practice to secure cylinders in use with chains or clamps to prevent them from falling with possible valve shear-off.

Although these practices generally are sufficient to prevent accidentally breaking off the valves, they are not infallible. Accidents could occur which would break off the valves in spite of these practices. Some use of gases supplied in high pressure cylinders, do not lend themselves to following these practices. For example, it is often difficult to secure a cylinder while the cylinder is used to supply gases for welding. Human error and failure to follow safe practices for the use and storage of high pressure cylinders is an even more prevalent cause for accidents resulting in shearing valves from high pressure cylinders.

It is desirable to eliminate the potential grave danger to personnel and equipment that exists when a gas cylinder valve is sheared off.

It is therefore an object of this invention to provide a pressure contained vessel which is not capable of propelling itself into the air in the event that valves or other fittings are severed from the vessel.

SUMMARY OF THE INVENTION

The objects of this invention are achieved by providing a pressure containing vessel, comprising at least one channel for flow of fluids into and out of the vessel, the vessel capable of storing fluid contents at a maximum pressure which is high enough that unrestricted flow out of the vessel through the channel could exert a force on the vessel which exceeds the weight of the vessel. The improvement of the vessel is a means internal to the vessel to restrict the flow through the channel from the vessel which is effective to limit the force exerted on the vessel by otherwise unrestricted flow through the channel from the maximum storage pressure to a force less than that exerted by gravity on the pressure containing vessel.

An embodiment of the present invention provides a restriction orifice as the means to limit the flow. The flow area of the orifice multiplied by the maximum storage pressure is less than the weight of the empty vessel. This flow restriction will prevent the vessel from becoming a dangerous projectile if fittings such as a valve or regulator are accidentally severed from the outlet of the channel.

The vessel of this invention can store fluid which are gases, vapors, combination of liquids and vapors, or supercritical fluids.

DETAILED DESCRIPTION OF THE INVENTION

Figure 1:
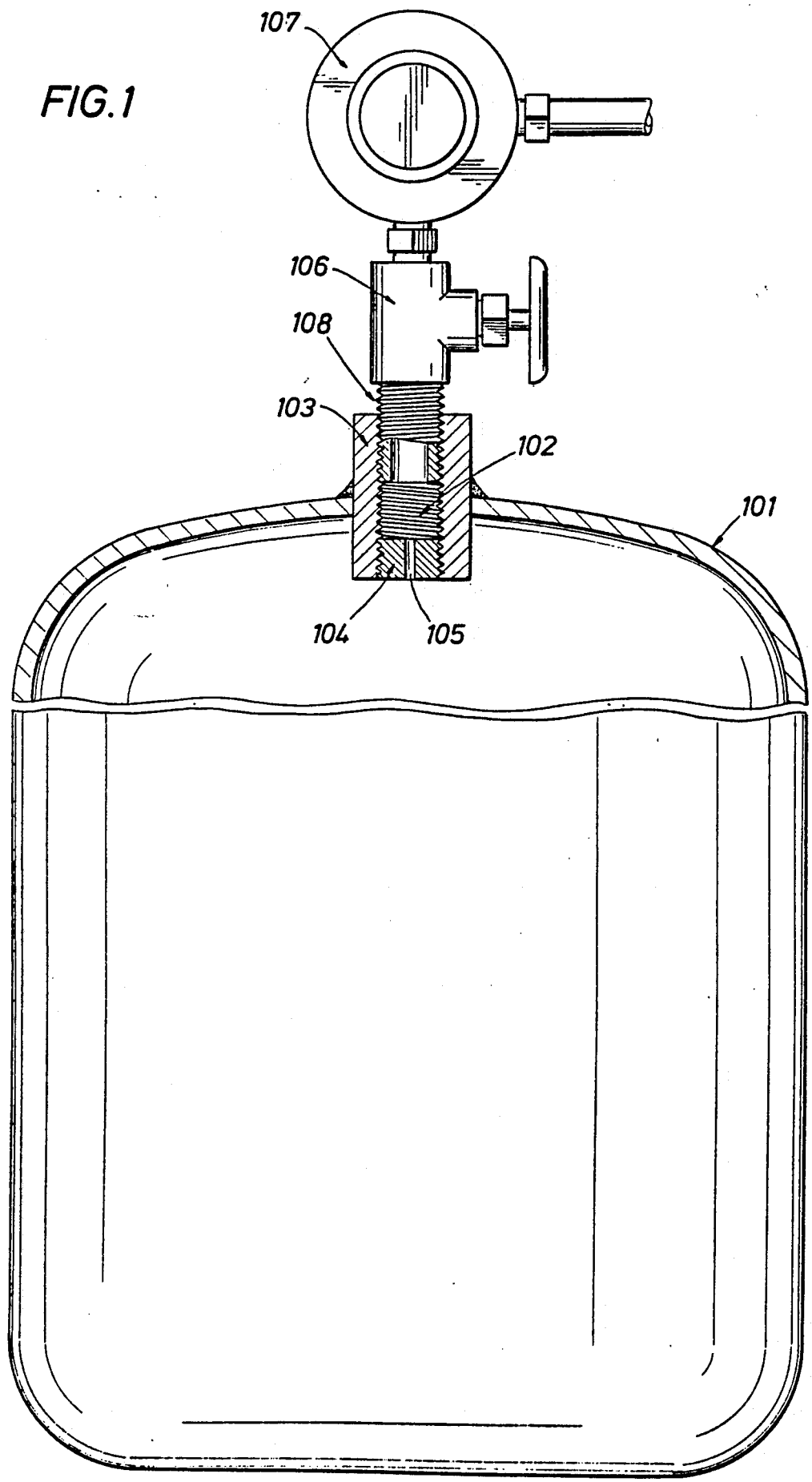
FIG. 1 is a cross sectional view of a pressure containing vessel of this present invention.

An embodiment of the present invention is displayed in FIG. 1. The vessel shell, 101, must be of a thickness which is sufficient to contain the maximum storage pressure and is preferably of a material which is inert to the material to be stored. A single channel, 102, for flow of fluids into or out of the vessel is shown as a threaded orifice in a neck, 103. The neck is permanently attached to the shell, 101. A means for restricting flow from the vessel is shown as a plug, 104, with cooperating threads inserted into the channel, 102. A hole, 105, is drilled through the plug, 104, parallel to the channel, 102. The diameter of the hole, 105, is critical when a restriction orifice, or drilled plug, is utilized as the means to restrict flow through the channel from the vessel. In the illustrated embodiment, the cross sectional area of the hole, 105, times the maximum storage pressure, must be less than the weight of the vessel. If the vessel is a 25 pound cylinder, and the cylinder is rated to hold contents at up to 2,000 psig pressure, the cross sectional area of the hole must be less than 25 divided by 2000 or 0.0125 square inches. This corresponds to about a ⅛ inch diameter hole. A cylinder such as that shown will typically be fitted with a valve, 106, and a regulator, 107, connected to the channel, 102, by a nipple, 108, with cooperating threads. The plug, 104, will therefore act as a flow restrictor and limit the force exerted on the cylinder if the valve and regulator are inadvertently severed from the cylinder.

The plug, 104, could be made to be removable by having an indentation in the shape of a socket, (such as a hexagonal socket for an allen wrench), or a slot or projections which can be used to grip the plug with an appropriate tool through the channel. Alternatively, the plug could be an integral part of the shell or neck and not be removable.

It is an important characteristic of the present invention that the means to restrict flow be internal to the vessel. In the cylinder shown, the means to restrict flow must be within the channel, 102. The means to restrict the flow could be within the nippled or integral with the nipple, 108, so long as the means to restrict flow is within the portion of the nipple, 108, which is inserted into the channel, 102, which is defined by the neck, 103. Being internal to the vessel, the means to restrict flow cannot be severed from the vessel by accidental impacts to the fittings which are connected to the vessel. Being connected to the vessel by pipe and tubing, fittings such as the valve, 106, and regulator, 107, are much more vulnerable to damage than the neck or shell of the cylinder. If the nipple, 108, is integral with the valve, 106, the means to restrict flow then may also be integral with the valve as long as the means to restrict flow is in the portion of the valve which is located within the channel, 102, so that the means to restrict flow would not be severed from the vessel if the rest of the valve is sheared from the vessel.

Figure 2:
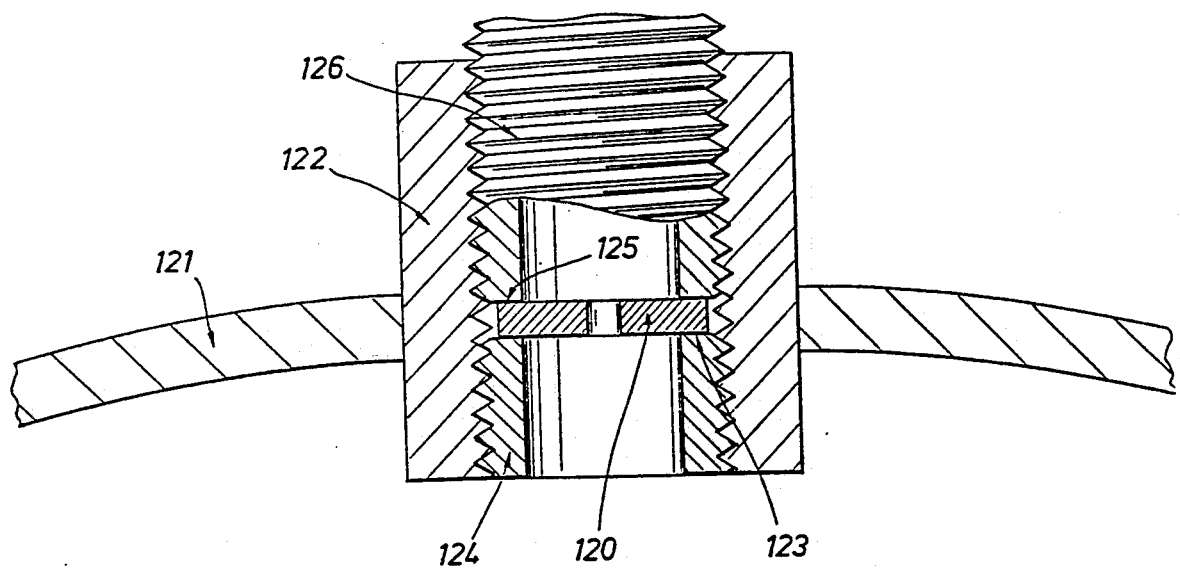
FIG. 2 is a cross sectional view of an alternative embodiment of the pressure containing vessel of this invention.

An alternative embodiment is displayed in FIG. 2. In this embodiment, the means to restrict flow is shown as a restriction orifice, 120, the restriction orifice being a flat plate with an appropriate sized hole drilled through the plate. FIG. 2 displays the shell of the pressure containing vessel, 121. A neck, 122, provides a channel for flow to enter and exit the pressure containing vessel, and provides female threads for attachment of fittings to the pressure vessel. The restriction orifice, in the embodiment displayed in FIG. 2, is held in place within the neck by a lip, 123. In FIG. 2 the lower lip is provided by a surface of a lower nipple, 124, and an upper lip, 125 by a surface of an upper nipple, 126. Both the upper nipple and the lower nipple have threads cooperating with those of the neck, 122. In the embodiment displayed, the upper nipple also provides threads protruding from the neck, 122, providing a means for attaching fittings such as regulators and valves.

When volatile liquids are stored in vessels such as those of this invention, outlets are typically provided for both vapor and liquid phases. In this situation, a restriction means may be provided for each outlet or either outlet. The pressure vessels may, in general, store liquids, vapors, combinations thereof, or supercritical fluids. Supercritical fluids are generally elements or compounds such as argon, hydrogen, helium, methane, nitrogen and oxygen, which have critical temperatures below ambient temperatures. When these materials are stored at ambient temperatures above their critical pressure, they are neither vapors nor liquids, but supercritical fluids.

The present invention is applicable if the maximum storage pressure within the vessel is sufficiently high that otherwise unrestricted flow out of the channel provided for filling and removing fluids will exert sufficient force on the vessel to create a hazard. For this invention, a hazard is considered to exist if this force can exceed the weight of the empty vessel. The maximum fluid storage pressure will usually exceed 100 psig and more likely be in the range of from about 500 to about 10,000 psig for this force to exceed the empty weight of the vessel.

In a preferred embodiment, the pressure containing vessel is a portable vessel. Stationary vessels may also benefit from the practice of the present invention, but when a vessel is stationary, an alternative to the present invention is to securely fix the vessel to an immobile surface, so that forces of escaping fluid will not move the vessel. Portable vessels are also subject to mishandling during transportation and are often difficult to secure while not being transported and therefore in much greater need of the present invention.

Even with the practice of the present invention, a portable vessel with otherwise unrestricted flow may have enough force exerted on it to move it on a flat surface. Although this will not be as hazardous as a vessel subjected to totally unrestricted escaping flow, it is still desirable to minimize this movement. In a preferred embodiment, it is therefore a feature of this invention to provide a skid surface on the exterior of the vessel. This skid resistant surface could be a rubber-like coating, or a rough paint coating. This skid resistant surface will minimize movement of the vessel along a flat surface if the fittings, such as valves or regulators, are accidentally severed from the vessel.

I claim:

1. In a pressure vessel capable of storing fluids under pressure comprising a shell and a channel formed through the shell for fluid to flow into or out of the vessel wherein unrestricted flow out of the vessel through the channel could exert a force on the vessel which exceeds the empty weight of the vessel, the improvement being a means internal to the vessel to restrict flow through the channel from the vessel, the means to restrict the flow being effective to limit the force exerted on the vessel to less than that exerted by gravity on the pressure vessel.

2. The vessel of claim 1 wherein the means to restrict the flow comprises a means to restrict flow to a cross sectional area which is less than the empty weight of the vessel divided by the maximum pressure at which fluids could be stored within the vessel.

3. The vessel of claim 1 wherein the means to restrict flow is a restriction orifice.

4. The vessel of claim 3 wherein the restriction orifice is an essentially flat plate having at least one purification and the cross sectional area of the perforation times the maximum pressure at which fluids could be stored within the vessel equals a force which is less than the empty weight of the vessel.

5. The vessel of claim 1 wherein the vessel contains a gas or vapor.

6. The vessel of claim 1 wherein the vessel contains a liquid-vapor mixture.

7. The vessel of claim 1 wherein the vessel contains a supercritical mass.

8. The vessel of claim 1 wherein the vessel contains fluid under a pressure of between about 500 and about 10,000 psig pressure.

9. The vessel of claim 1 wherein the vessel is a portable vessel.

10. The vessel of claim 1 wherein the means for restricting the flow is in direct contact with any fluids which are stored in the vessel.

11. The vessel of claim 3 wherein the vessel is a portable vessel.

12. The pressure containing vessel of claim 1 further comprising an outer surface of a skid resistant material.

* * * * *